United States Patent

[11] 3,625,566

| [72] | Inventor | Teuvo Suuronen<br>Lievestuore, Finland |
|---|---|---|
| [21] | Appl. No. | 6,114 |
| [22] | Filed | Jan. 27, 1970 |
| [45] | Patented | Dec. 7, 1971 |
| [32] | Priority | Feb. 1, 1969 |
| [33] | | Finland |
| [31] | | 3133/68 |

[54] TURNING MECHANISM FOR AN ENDBOARD OF A LORRY
2 Claims, 3 Drawing Figs.

| [52] | U.S. Cl. | 298/23 D |
|---|---|---|
| [51] | Int. Cl. | B60p 1/26 |
| [50] | Field of Search | 298/23 R, 23 S, 23 D, 23 DF |

[56] References Cited

UNITED STATES PATENTS

| 2,769,662 | 11/1956 | Schonrock | 298/23 D |
|---|---|---|---|
| 2,226,901 | 12/1940 | Fairbanks | 298/23 D |
| 3,072,439 | 1/1963 | Adkins | 298/23 S |

FOREIGN PATENTS

| 985,870 | 3/1965 | Great Britain | 298/23 D |

*Primary Examiner*—Richard J. Johnson
*Attorney*—Lackenbach & Lackenbach

ABSTRACT: A turning mechanism for an endboard of a lorry comprising an operating arm displaced by means of the tilting movement of the platform of the lorry for turning of the endboard.

PATENTED DEC 7 1971

3,625,566

INVENTOR
TEUVO SUURONEN
BY Rackenbach & Rackenbach
ATTORNEYS

TURNING MECHANISM FOR AN ENDBOARD OF A LORRY

The present invention is an improvement of devices which turn the endboard of the platform of a lorry when the platform is tilted. When the platform is tilted, such devices automatically open the endboard so that the cargo can be unloaded and, similarly, when the platform is lowered, the devices turn the endboard up. Besides saving the work of opening and closing the endboard, these devices also give the advantage that since the endboard need not be raised by hand, it can be made heavy and robust enough to stand the stresses caused by rocks and similar materials.

Such a turning mechanism for an endboard is presented, among other things, in the Swedish Pat. No. 205,234. In this construction the movement between the platform and the lorry chassis for operating the endboard is transmitted by an arm mounted on the platform. During tilting the platform this arm is supported against a catch on the chassis and turns pushing another arm that further turns the endboard. The device in accordance with the Swedish patent is, however, unnecessarily complicated and consequently expensive and unreliable in operation.

The purpose of this invention is to obtain a simpler and better device for turning the endboard in which mechanism the turning of the endboard pivotally mounted on he platform is caused by means of an arm connected to the endboard and by means of a slide bar connected to the opposite end of said arm and displaceable in parallel with the platform. The invention is based on the principle that the movement of the slide bar that turns the endboard is produced by a change in the proportions of the triangle consisting of said slide bar, the lorry chassis, and the intermediate arm, when the platform is tilted. In this way it is possible to make the construction very robust with low expenses and to obtain a reliable mechanism.

In the following an embodiment of the invention is described with reference to the enclosed drawings.

Figure 1:
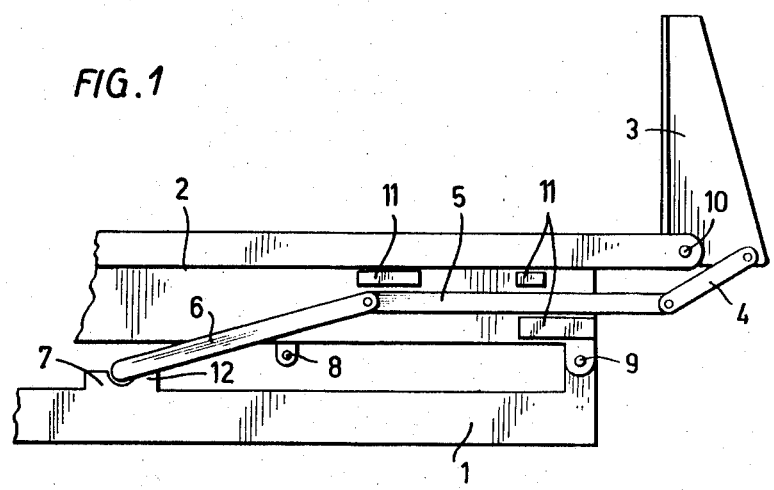
FIG. 1 is a schematic side view of the tipping mechanism of the endboard of a lorry with the platform in he lowered normal position.

The drawing shows a lorry chassis 1, on which a platform 2 has been mounted at 9 so that it can be tilted in the normal way. On the other hand, on this platform an endboard 3 has been mounted at 10, and the endboard is kept upright by an intermediate arm 4 and by a slide bar 5, which latter one is supported slidably in guides 11. The other end of the slide bar is connected with an arm 6, which is supported in a groove 7 on the lorry chassis. Each side of the lorry has a set of corresponding structures. A particularly strong construction is obtained when the arms 6 are interconnected with a crossbar at their ends closer to the chassis.

The turning mechanism operates as follows:

When the platform 2 is tilted up, the catch 12 of the groove 7 prevents the lower end of the arm 6 from sliding towards the rear end of the chassis. When the tilting movement goes on, the arm therefore becomes more and more vertical and the upper end of the bar correspondingly pulls the slide bar 5 towards the front end of the chassis and the intermediate arm 4 thus forces the endboard to turn around its bearings 10 in the opening direction. After the endboard has turned so long that its center of gravity has passed the vertical plane of the bearing point 10, the opening continues by weight of the endboard and of the load. When the platform has been tilted, in this example, about 15°, the endboard is entirely open and the arm 6 starts moving upwards supported by a catch 8 or the platform.

Figure 2:
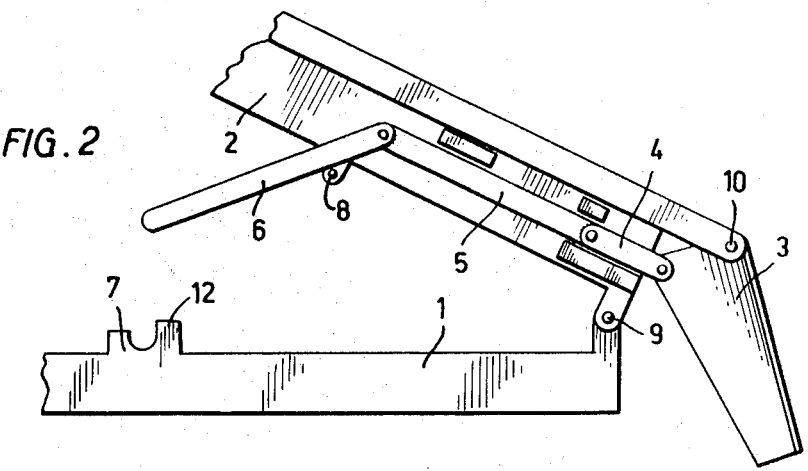
FIG. 2 shows the same with the platform in tilted position.
Figure 3:
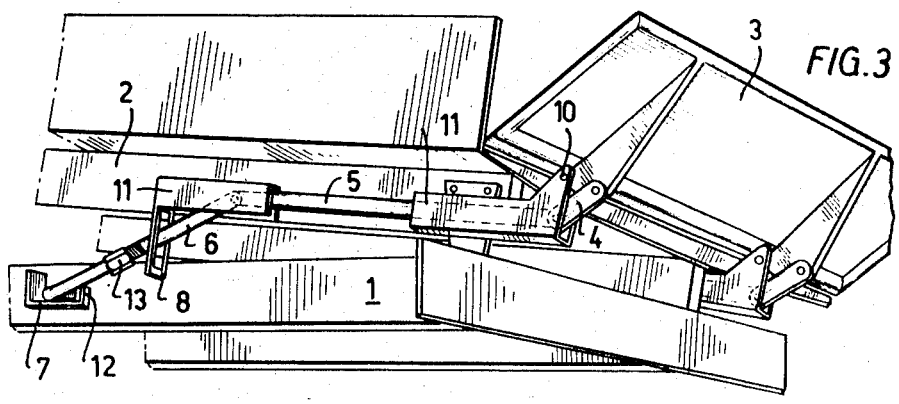
FIG. 3 is a more detailed perspective view of the mechanism of the FIGS. 1 and 2.

In FIG. 2 the platform has been tilted up and the endboard has turned down. The arm 6 is supported by the catch 8 fastened to the platform so that when the platform is lowered, the end of the arm 6 meets the groove 7 and starts pushing the slide bar backwards, which further turns the endboard up by means of the intermediate arm 4.

What I claim is:

1. A turning mechanism for an endboard of a lorry comprising a slide bar mounted on the platform of the lorry for displacement in parallel with said platform, an arm pivotally connecting the endboard of said lorry to aid slide bar, a connecting rod pivoted at one end portion thereof to said slide bar to form a one-armed lever pivoted solely to said connecting rod and free to rotate thereabout and translate therewith an abutment supported by the chassis of the lorry formed to engage said connecting rod remotely of said slide bar during at least final lowering of said platform to turn the endboard towards its closed position, and a stop supported by said platform and positioned in the path of movement of said connecting rod during raising of said platform to support said connecting rod when the endboard is in the open position and thereby enable disengagement of said connecting rod from said abutment after initial raising of said platform and reengagement therebetween prior to final lowering of the platform.

2. Turning mechanism defined in claim 1 further comprising adjustment means on said connecting rod for adjusting the length thereof.

* * * * *